(12) United States Patent
Kim

(10) Patent No.: US 8,016,933 B2
(45) Date of Patent: Sep. 13, 2011

(54) NON-SULFUROUS STATUARY MATERIAL AND METHOD OF MANUFACTURING THE SAME

(75) Inventor: Sung-Man Kim, Seoul (KR)

(73) Assignee: Manjirak Co., Ltd., Seoul (KR)

( * ) Notice: Subject to any disclaimer, the term of this patent is extended or adjusted under 35 U.S.C. 154(b) by 357 days.

(21) Appl. No.: 12/513,296

(22) PCT Filed: Nov. 1, 2007

(86) PCT No.: PCT/KR2007/005482
§ 371 (c)(1),
(2), (4) Date: May 1, 2009

(87) PCT Pub. No.: WO2008/060055
PCT Pub. Date: May 22, 2008

(65) Prior Publication Data
US 2010/0064936 A1    Mar. 18, 2010

(30) Foreign Application Priority Data

Nov. 17, 2006 (KR) .................. 10-2006-0113704
Apr. 12, 2007 (KR) .................. 10-2007-0036115

(51) Int. Cl.
*C08L 3/02* (2006.01)
*C08L 91/08* (2006.01)
*B44C 5/00* (2006.01)

(52) U.S. Cl. .................. 106/215.2; 106/216.1

(58) Field of Classification Search ............ 106/215.2, 106/216.1
See application file for complete search history.

(56) References Cited

U.S. PATENT DOCUMENTS

| | | | | |
|---|---|---|---|---|
| 1,897,034 A | * | 2/1933 | Harrison et al. | 106/38.51 |
| 2,238,776 A | * | 4/1941 | Kleinicke | 252/88.1 |
| 2,823,133 A | * | 2/1958 | Salvador | 106/38.25 |
| 5,498,645 A | | 3/1996 | Mariano et al. | |
| 6,030,980 A | * | 2/2000 | Suzuki | 514/281 |

FOREIGN PATENT DOCUMENTS

| | | |
|---|---|---|
| JP | 60014932 | 1/1985 |
| KR | 10-2000-0065458 | 11/2000 |
| KR | 10-2002-0084911 | 11/2002 |

\* cited by examiner

*Primary Examiner* — David M Brunsman
(74) *Attorney, Agent, or Firm* — IPLA P.A.; James E. Bame

(57) ABSTRACT

This invention relates to a non-sulfurous statuary material and a method of manufacturing the same, and particularly, to a novel statuary material containing no sulfur, which is capable of substituting for a conventional statuary material containing sulfur as a component of a statuary filling composition, in particular, an industrial statuary material, and to a method of manufacturing the same. In the case where the statuary material according to this invention is used, because it contains no sulfur, unlike conventional statuary material, environmental contamination and the generation of offensive odors due to sulfur are avoided, and furthermore, the use of material having a specific gravity lower than that of sulfur facilitates modeling. The claimed material includes micro wax, petroleum jelly, zinc stearate and starch.

5 Claims, No Drawings

NON-SULFUROUS STATUARY MATERIAL AND METHOD OF MANUFACTURING THE SAME

TECHNICAL FIELD

The present invention relates to a non-sulfurous statuary material and a method of manufacturing the same, and more particularly, to a novel statuary material containing no sulfur, which is capable of substituting for conventional statuary material, which contains sulfur as a component of a statuary filling composition, in particular, an industrial statuary material, and to a method of manufacturing the same.

BACKGROUND ART

Generally, a statuary material, useful in the field of art education, exhibitions, movie animation, etc., includes, for example, a gypsum pillar, soap, rubber, and a resin pillar. The gypsum pillar is problematic in that it generates powder in a large amount when carved into a desired shape. The gypsum powder thus generated makes the surroundings dirty and is also injurious to the health of children, who have low immunity. The soap gives off a strong smell and can be manufactured only to a relatively small size. Thus, the soap is unsuitable for use as an environmentally friendly statuary material and is considerably limited in its ability to be carved into a desired shape by a user. Rubber has high binding force between rubber components, but is difficult to cure. Thus, it is difficult for a user to carve the rubber into a fine 3D shape. The resin pillar, which is exemplified by hard plastic, should be worked at a predetermined pressure, in order to carve it into a desired shape. Hence, the working rate is decreased, and the hand of the user may be easily hurt in the event of a careless mistake. In particular, there are problems in which children, having low dexterity, may hurt their hands upon the use of the resin pillar, which is too hard.

An industrial statuary material, which is mainly used as an automobile model material, is in a hard state at normal times, but becomes soft when placed in an oven to thus apply heat thereto. In such a soft state, the statuary material is formed into a pre-determined shape in order to manufacture an automobile model. After the formation of the predetermined shape, the statuary material for an automobile model is solidified at atmospheric temperature, and then the model thus solidified is precisely carved using a carving knife, thereby completing a desired automobile model.

However, the conventional statuary material used to manufacture the automobile model contains a large amount of sulfur. When the statuary material is removed from a clay oven to work it, a great amount of sulfur gas is discharged from the statuary material and offensive odors are generated, undesirably giving the worker a headache. Further, after the use thereof, it is very difficult to treat the waste thereof. Such waste does not decompose, and thus is illegal to bury, and furthermore, may emit sulfur dioxide and dioxins into the atmosphere when incinerated, with the undesirable result that the illegal burial of such waste cannot be prevented from arising. Moreover, because the specific gravity of sulfur is high, a model manufactured from the conventional statuary material is very heavy, compared to other models having the same volume, thus making it difficult to transport the model.

Hence, with the goal of improving the aforementioned conventional statuary materials, research into novel non-sulfurous statuary material is being continuously conducted these days, in consideration of environmentally friendly properties, stability, ease and efficiency of working, and reliability of statuary material.

DISCLOSURE OF INVENTION

Technical Problem

Accordingly, the present invention has been made keeping in mind the above problems occurring in the prior art, and an object of the present invention is to provide a non-sulfurous statuary material and a method of manufacturing the same. More particularly, the present invention provides a non-sulfurous statuary material, which is environmentally friendly, and thus can be used to manufacture an industrial model, for example, an automobile model, thereby avoiding the generation of offensive odors due to sulfur, enabling it to be recycled several times, and generating no sulfur-based toxic gases upon treatment of waste.

Technical Solution

According to the present invention, a non-sulfurous statuary material may include a statuary material composition including micro wax, petroleum jelly and zinc stearate, and a statuary filling composition including starch, wherein, based on a total weight of the non-sulfurous statuary material, the micro wax is in an amount of 10~25 wt %, the petroleum jelly is in an amount of 3~20 wt %, the zinc stearate is in an amount of 5~25 wt %, and the starch is in an amount of 30~70 wt %.

The non-sulfurous statuary material may further include paraffin wax in an amount of 5~15 wt % based on the total weight of the non-sulfurous statuary material.

The starch is preferably modified starch containing sodium octenyl succinate.

According to the present invention, a method of manufacturing the non-sulfurous statuary material may include (I) placing micro wax, petroleum jelly and zinc stearate in a furnace, and thermally treating the micro wax, the petroleum jelly and the zinc stearate; (II) placing the micro wax, the petroleum jelly and the zinc stearate, which are thermally treated, and starch in a container, and kneading the micro wax, the petroleum jelly, the zinc stearate, and the starch; and (III) placing the micro wax, the petroleum jelly, the zinc stearate, and the starch, which are kneaded, in a vacuum extruder, and extruding the micro wax, the petroleum jelly, the zinc stearate, and the starch into a desired target shape.

The method may further include adding paraffin wax in the kneading of the (II).

Advantageous Effects

In the case where the statuary material according to the present invention is used to manufacture a model, because it contains no sulfur, unlike a conventional statuary material, no offensive odors are generated. Presently available, a statuary material (clay) contains a great amount of sulfur, and thus is heavy, having a specific gravity of 1.5 or more. However, the statuary material using starch according to the present invention has a specific gravity of about 1.2, which is relatively light, thereby facilitating the transport thereof and the manufacture of large-sized products.

The surface of the statuary material according to the present invention may be soft or hard depending on the ratio of a statuary material composition and a statuary filling composition, and therefore, the hardness thereof is easy to control, thereby realizing diverse kinds of statuary material.

The statuary material according to the present invention is 100% inflammable and environmentally friendly, and may be 100% recycled.

That is, the statuary material according to the present invention has both stability and functionality, so that it may be widely applied to the manufacture of industrial models or may be used as a carving material in schools.

BEST MODE FOR CARRYING OUT THE INVENTION

According to the present invention, a non-sulfurous statuary material is composed mainly of micro wax, petroleum jelly, zinc stearate, and starch, and may further include paraffin wax.

Micro Wax

Micro wax, called microcrystalline wax, is obtained by dewaxing or deoiling lube distillate, having high viscosity, through solvent extraction, and is composed mainly of side-chain saturated hydrocarbons. The micro wax has a melting point of 65.5~76.6 C, and exhibits toughness and flexibility. The micro wax, having a high melting point and a high viscosity, has adhesiveness, and shows a white color or a yellow color. Because the micro wax is highly affinitive to an oil component, it has higher oil content than paraffin wax.

The micro wax efficiently combines with other kinds of wax and is thus used to increase the melting point, viscosity and hardness, and also serves as an antiperspirant. The micro wax is mainly used for various wax compounds, antioxidants of rubber-related products, dielectric materials, and water- or moisture-resistant coating agents.

Vaseline®

Vaseline®, also called petroleum jelly or paraffin jelly, is saturated hydrocarbon having a composition of $C_nH_{n+2}$, and is a gel in which microcrystalline solid hydrocarbon is dispersed by liquid hydrocarbon. Vaseline® has a melting point of 38~54 C, and has a white color or a yellow color. Vaseline® is soluble in benzene, chloroform, ether, petroleum benzene, carbon disulfide, and oil. Further, Vaseline® is highly miscible with other materials, and thereby the surface of a target becomes wet or smooth. Vaseline® is mainly used for anti-friction agents, water-resistant agents, cosmetic materials, and medical materials.

Zinc Stearate

Zinc stearate ($Zn(C_{17}H_{35}COO)_2$) is mainly used as a non-toxic stabilizer. Zinc stearate, which is non-toxic, has high activity and is quickly hardened. Zinc stearate is particularly effective as a dispersant for uniform mixing with other materials. Further, zinc stearate is used to aesthetically process the surface of a target and to efficiently impart a color to the processed target surface upon coloring.

Starch

Starch is a natural polymer material produced after a plant undergoes photo-synthesis using water and carbon dioxide. In order to alleviate the disadvantages of starch and enhance the advantages thereof, starch is physically or chemically changed, thus producing modified starch.

In the present invention, modified starch, obtained by adding an emulsifier to starch, may be used. Useful emulsifiers are exemplified by sodium octenyl succinate, and are ester-linked to the OH group of starch, so that a hydrophobic group is introduced into the starch, which is hydrophilic, to thus impart emulsifying capacity and stability. In particular, in the present invention, corn starch is preferably used.

That is, modified starch, containing sodium octenyl succinate, has a hydroxyl group and a carboxyl group, as a hydrophilic portion, and hydrocarbon, as a hydrophobic portion, in one molecule, to thus act as an emulsifier and a stabilizer.

Paraffin Wax

Paraffin wax, called petroleum wax, is obtained by refining crude oil, in particular, crude wax having a high boiling point, from which lubricating oil stocks are separated, and consists mainly of straight-chain saturated hydrocarbons. The paraffin wax has a melting point of 47~65 C and is chemically stable.

The paraffin wax efficiently combines with other kinds of wax and is thus used as a softening agent for increasing flexibility, and also serves as an agent for promoting water resistance. The paraffin wax is mainly used for coating agents of packaging paper, plasticizers, mold releasing agents, and candle materials.

Manufacture Method

The statuary material according to the present invention consists of a statuary material composition including micro wax, petroleum jelly, and zinc stearate and a statuary filling composition including starch. In the method of manufacturing the statuary material according to the present invention, micro wax, petroleum jelly and zinc stearate are placed in a furnace and thermally treated. As such, the thermal treatment is conducted in a temperature atmosphere ranging from 150 C to 200 C.

The micro wax is used in an amount from 10 wt % to 25 wt %, based on the total weight of the statuary material, consisting of the statuary material composition and the statuary filling composition. When the amount of micro wax is less than 10 wt %, the ability to carve the statuary material is good but the adhesive force is decreased. On the other hand, when the amount of micro wax is greater than 25 wt %, the adhesiveness of statuary material components is good but the carving ability is poor.

petroleum jelly is used in an amount from 3 wt % to 20 wt %, based on the total weight of the statuary material. When the amount of petroleum jelly is less than 3 wt %, the surface of the statuary material is not wet, but is too hard. On the other hand, when the amount of petroleum jelly is greater than 20 wt %, the hardness of the statuary material is decreased, and the carving ability is poor.

The zinc stearate is used in an amount from 5 wt % to 25 wt %, based on the total weight of the statuary material. When the amount of zinc stearate is not less than 5 wt %, the surface of the statuary material may be aesthetically processed. However, when the amount of zinc stearate exceeds 25 wt %, the surface of the statuary material becomes rough.

Subsequently, the micro wax, the petroleum jelly, and the zinc stearate are placed in a container along with starch, and kneaded together. At this time, paraffin wax may be further added as the statuary material composition. The paraffin wax is used in an amount from 5 wt % to 15 wt %, based on the total weight of the statuary material.

When the amount of paraffin wax is not less than 5 wt %, the paraffin wax may increase flexibility of the micro wax, thus increasing the carving ability. When the amount of paraffin wax exceeds 15 wt %, the paraffin wax may increase activity of zinc stearate but may flow out of the oven.

In addition, the starch is used in an amount from 30 wt % to 70 wt %, based on the total weight of the statuary material. When the amount of starch is not less than 30 wt %, the starch may be efficiently kneaded with the micro wax, the paraffin wax, the petroleum jelly, and the zinc stearate. When the amount of starch is not greater than 70 wt %, the starch may be efficiently physically or chemically bound with the micro wax, the paraffin wax, the petroleum jelly, and the zinc stearate, thus increasing the flexibility and bindability of the statuary material.

Thereafter, the micro wax, the petroleum jelly, the zinc stearate and the starch, or alternatively, the micro wax, the petroleum jelly, the zinc stearate, the starch and the paraffin wax, which are uniformly kneaded at step (II), are placed in a vacuum extruder, and extruded into a desired shape corresponding to a target. Although the extrusion is preferably conducted to obtain a cylindrical shape, it may be performed to form various shapes using molds having different shapes depending on need, which will be apparent to those skilled in the art.

After the extrusion, the surface of the target may subsequently be colored. The block-shaped target may be processed into a desired design, and the surface of the statuary material, corresponding to the surface of the target, may be colored. For example, because the statuary material of the present invention is hardened in the atmosphere, various blocks, instead of wood, may be manufactured therefrom.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the present invention provides a non-sulfurous statuary material and a method of manufacturing the same. The non-sulfurous statuary material according to the present invention is both safe and functional, and thus can be applied to the manufacture of industrial models, in particular, automobile models, and can also be used as statuary material in every school.

The invention claimed is:

1. A non-sulfurous statuary material, comprising a statuary material composition including micro wax, petroleum jelly and zinc stearate, and a statuary filling composition including starch, wherein, based on a total weight of the non-sulfurous statuary material, the micro wax is in an amount of 10~25 wt %, the petroleum jelly is in an amount of 3~20 wt %, the zinc stearate is in an amount of 5~25 wt %, and the starch is in an amount of 30~70 wt %.

2. The non-sulfurous statuary material according to claim 1, further comprising paraffin wax in an amount of 5-15 wt % based on the total weight of the non-sulfurous statuary material.

3. The non-sulfurous statuary material according to claim 1, wherein the starch is modified starch containing sodium octenyl succinate.

4. A method of manufacturing the non-sulfurous statuary material of claim 1, comprising:
  (I) placing micro wax, petroleum jelly and zinc stearate in a furnace, and thermally treating the micro wax, the Vaseline and the zinc stearate;
  (II) placing the micro wax, the petroleum jelly and the zinc stearate, which are thermally treated, and starch in a container, and kneading the micro wax, the petroleum jelly, the zinc stearate, and the starch; and
  (III) placing the micro wax, the petroleum jelly, the zinc stearate, and the starch, which are kneaded, in a vacuum extruder, and extruding the micro wax, the petroleum jelly, the zinc stearate, and the starch into a desired target shape.

5. The method according to claim 4, further comprising adding paraffin wax in the kneading of the (II).

* * * * *